United States Patent [19]

Chu

[11] Patent Number: 5,469,466
[45] Date of Patent: Nov. 21, 1995

[54] SYSTEM FOR HIGHLY REPEATABLE CLOCK PARAMETER RECOVERY FROM DATA MODULATED SIGNALS

[75] Inventor: David C. Chu, Woodside, Calif.

[73] Assignee: Hewlett-Packard Company, Palo Alto, Calif.

[21] Appl. No.: 183,466

[22] Filed: Jan. 19, 1994

Related U.S. Application Data

[63] Continuation-in-part of Ser. No. 182,887, Jan. 18, 1994, abandoned.

[51] Int. Cl.$^6$ ................................................ H04L 7/027
[52] U.S. Cl. .............................. 375/354; 375/224; 370/17
[58] Field of Search ........................... 375/106, 10; 370/17

[56] References Cited

U.S. PATENT DOCUMENTS

| | | | |
|---|---|---|---|
| 4,696,016 | 9/1987 | Rozema et al. | 375/110 |
| 4,807,257 | 2/1989 | Immink et al. | 375/106 |
| 5,157,651 | 10/1992 | Ghelberg et al. | 375/10 |
| 5,163,071 | 11/1992 | Gelin | 375/114 |

Primary Examiner—Stephen Chin
Assistant Examiner—Jeffrey W. Gluck

[57] ABSTRACT

A system for recovering parameters of an underlying clock signal from data modulated signals includes a time digitizer, or time stamping device, for sampling and locating edges of the data modulated signals, thereby selectively providing time stamp readings identifying incoming edges of the data signals. The time stamp readings are used, along with a user-input nominal clock frequency, to determine an array of actual clock cycle stamps, each representing an integral number of actual clock cycles occurring between adjacent time stamps. The array is then used in conjunction with the time stamps to characterize parameters of the underlying clock data. Once the clock parameters are recovered, a wide variety of information, for example, frequency and phase information, including jitter, can be determined with a very modest rate of sampling compared to the high data bandwidth. No phase locked loops are used and no physical clock is recovered. The system is operable over a well-defined range and is highly repeatable, independent of particular circuit design detail or parametric performance of circuit components.

20 Claims, 6 Drawing Sheets

SYSTEM FOR HIGHLY REPEATABLE CLOCK PARAMETER RECOVERY FROM DATA MODULATED SIGNALS

This is a continuation-in-part of U.S. patent application Ser. No. 08/182,887, filed Jan. 18, 1994 now abandoned, the subject matter of which is hereby incorporated by reference.

FIELD OF THE INVENTION

This invention relates to data transmission and communication and, more particularly, to a system for highly repeatable clock parameter extraction from data modulated signals. Once a clock is effectively recovered, jitter and other phase-frequency information from the underlying clock can be obtained. The process is accomplished with very modest sampling rates compared to the high data bandwidth.

BACKGROUND

In digital transmission and communications, a wide variety of modulation schemes are used to encode data. For example, in a random NRZ data signal, data are represented by a constant signal level for the full duration of a bit interval, i.e., one clock cycle. By contrast, RZ (return-to-zero) data signals return to zero with each bit interval. In each case, all data transitions occur at clock transitions. However, not all clock transitions generate data transitions in NRZ data.

To decode the digital data under NRZ, RZ, or other modulation schemes, it is necessary, in general, to know the correct instances to sample the data. Preferably, the clock used to encode the data is available for decoding. However, in many cases, the encoding clock is not available, and a new clock must be synthesized at the receiving end.

However, it is sometimes desirable for system operators and system component manufacturers, who are not directly interested in the exact content of the data messages being sent and received, to know or monitor the frequency and phase behavior, both average and instantaneous, of the underlying clock of the data stream. Such measurements are particularly desirable in plesiosynchronous digital systems in which deliberate phase shifts are occasionally introduced to compensate for small clock frequency differences at different points of the system. Preferably, such measurements should be made in "live traffic", that is, made without interrupting the system operation. Furthermore, it is most desirable to make such measurements at relatively low speed, commensurate with the clock jitter bandwidth, in the presence of much higher data modulation bandwidth. For these measurements, it is not necessary to literally recover a physical clock.

Also, knowledge of the underlying clock frequency and phase can be used to monitor and control system performance and to predict bit error rate (BER), especially when the rate is too low for convenient measurement. Systems may be specified to tolerate a certain amount of jitter at various frequency components (jitter tolerance), and, therefore, the actual jitter at various system points should be measured (jitter generation). Jitter is considered as phase deviation above 10 Hz bandwidth. To guard against magnification of jitter when cascading components, the transfer of jitter from input to output should be characterized (jitter transfer). Ideally, these measurements are made during data modulation to be more realistic and, if possible, during actual system operation. When incompatibility does arise in system operation, a repeatable standard method of measurement is necessary to settle disputes between vendors and buyers, system operators, and service providers, as to whether each piece of equipment is within specifications, and, indeed, to determine if the specifications are adequate to ensure correct operation.

Although widely used, the conventional methods using phase lock loop (PLL) and surface acoustic wave (SAW) oscillators suffer from lack of accepted standards in PLL design regarding loop components, and loop dynamic filter and SAW detail performance parameters. In practice, the physical clocks synthesized likely differ from one design to another, even for identical data streams, thereby producing non-unique and non-repeatable measurements. This lack of repeatability is true even if the more serious PLL errors such as loss-of-lock or false locking have been overcome.

Therefore, persons skilled in the art would prefer a system for highly repeatable measurement based on an accurate representation of the underlying clock, independent of any particular circuit design detail or parametric performance of various components.

BRIEF SUMMARY OF THE INVENTION

There is, therefore, provided in a preferred embodiment of the present invention, a system for highly repeatable clock parameter recovery from data modulated signals. The system utilizes readings of a conventional time stamping device for selectively sampling and locating edges of the data modulated signals in the system. The time stamp readings are then used, along with a user-input nominal clock frequency, to calculate an array of actual clock cycle stamps, each representing an integral number of actual clock cycles occurring between adjacent time stamps. The array is used, in conjunction with the time stamps, to characterize the underlying data clock. Once the clock parameters are recovered, frequency and phase information, including jitter, can be determined.

Since the outcome of the cycle estimation process comprises whole numbers (integers), barring gross errors analogous to false locking and loss-of-lock in a phase lock loop (PLL), the outcome is the same, independent of any particular implementation detail. Any non-uniqueness comes from the time stamping process, but these are typically very small, being on the order of 50 picoseconds or less.

BRIEF DESCRIPTION OF THE DRAWINGS

These and other features and advantages of the present invention will become apparent by reference to the following detailed description of a presently preferred embodiment when taken in conjunction with the following drawings, in which.

DETAILED DESCRIPTION

Figure 1:
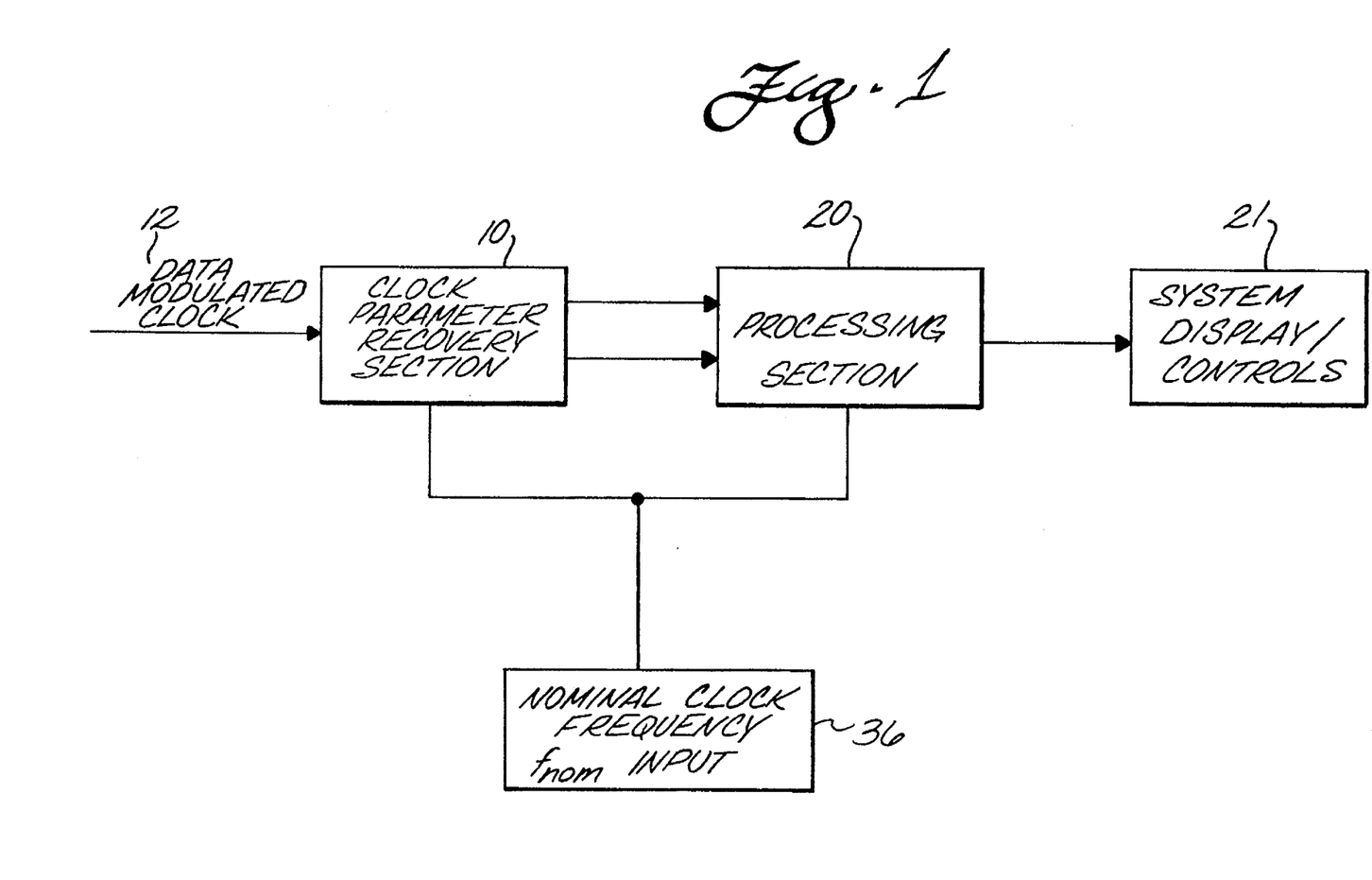
FIG. 1 is a general block diagram of a system for measurements based on highly repeatable clock parameter recovery according to the present invention.

Referring to FIG. 1, the highly repeatable clock parameter recovery system according to the present invention includes a clock parameter recovery section 10 for extracting parameters of an underlying clock from data modulated signals 12 input into the system. The recovered clock parameters are fed to a processing section 20 for determining a wide variety of measurements through digital filtering techniques. These measurements include, but are not limited to, phase deviation (jitter), frequency deviation, and average frequency, phase-spectral response, wander, TVAR, jitter transfer, etc. The measurements may then be displayed or used, either manually or automatically, to adjust the overall system application through system display/controls 21.

Figure 2:
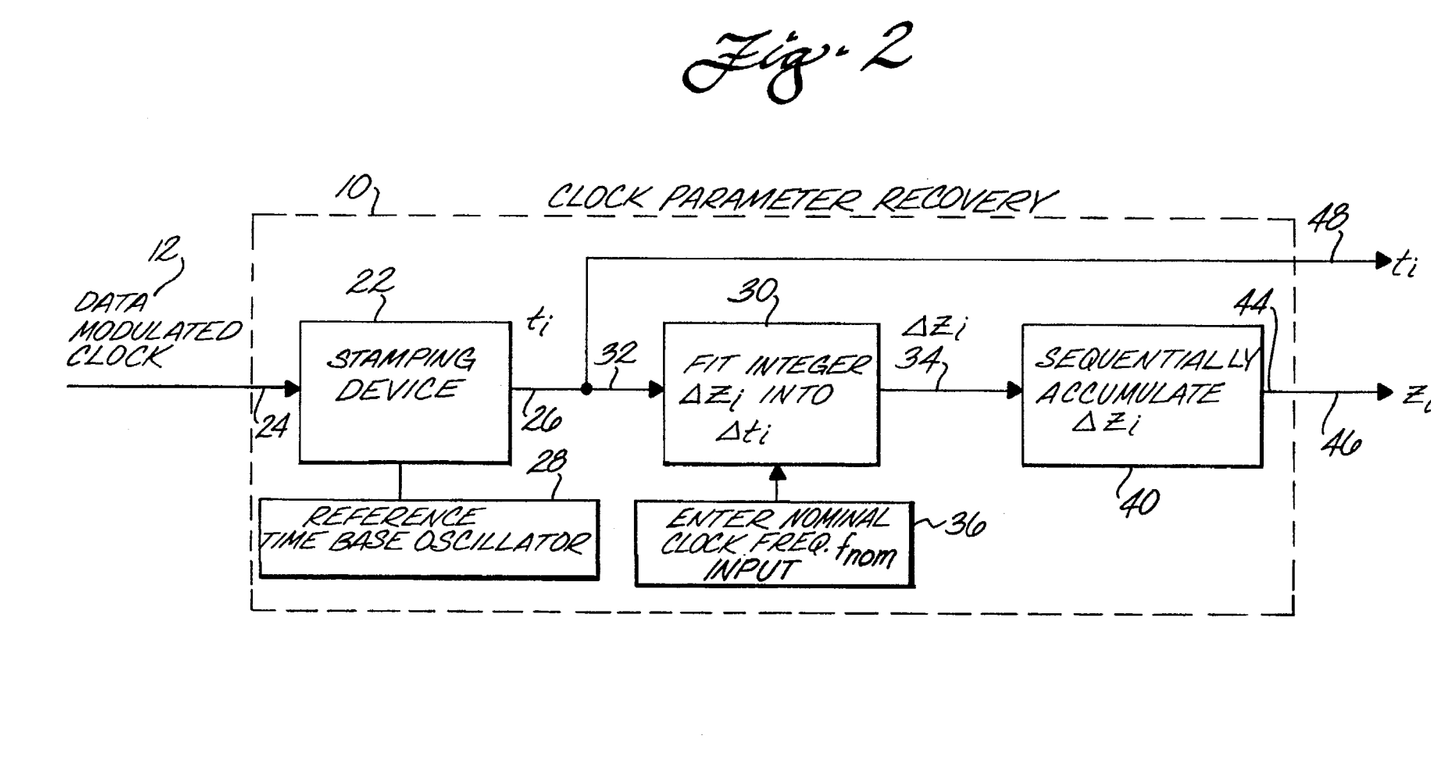
FIG. 2 is a block diagram of a data clock parameter recovery section of the system of FIG. 1.

Referring to FIG. 2, the clock parameter recovery section 10 includes a conventional time interval analyzer 22, also known as a time digitizer, or time stamping device. A suitable time interval analyzer, commercially available from Hewlett-Packard Co., Palo Alto, Calif., under the product names HP1725A, HP53310, and HP5372, sequentially samples and provides a high precision time stamp of selected data edges of the incoming data signal. The data signals are received by the device at input 24, and the time stamp information is delivered at an output 26. By time stamping, it is meant that the analyzer samples the data signals, locates at least selected edges of the data signal, and identifies when each such edge occurs. The time stamping device includes a built-in counter (not shown) referenced to a highly accurate reference time base oscillator 28 which is more precise than the underlying data clock. The oscillator may be, for example, a quartz oscillator.

The time stamping device can be controlled to selectively sample the rising or falling edges of the data signal, or both. The sampling rate of the device can also be controlled based on a user-defined pace setting or cycle time. Pace is one method of controlling the sampling rate of the device by having it count a specific number of edges between samples. The sampling rate of other time stamping devices can also be regulated on a real time basis, e.g., by a user-defined cycle time, during which the device is enabled to sample data after a set time interval.

Figure 3:
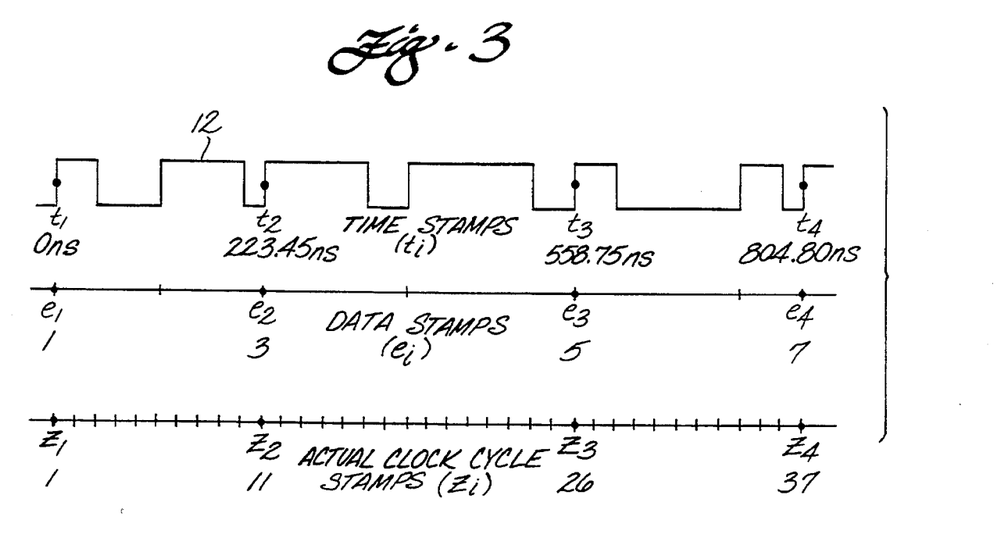
FIG. 3 is a graphical representation of the time stamp and cycle stamp parameters used to characterize the data clock.

Referring to both FIGS. 2 and 3, an example of the operation of the time stamping device is shown on the graph of the incoming data modulated signal 12, in this case, an NRZ signal. The time stamping device identifies every other rising edge of the data signal and records the occurrence of such edges in time stamps $t_i$ for i=1 to N, where N= the total number of time stamps taken.

The time stamps $t_i$ are (shown graphically in FIG. 3) made on every other rising edge of the data signal according to the pace setting (P=2) of the device. The time stamps have values corresponding to the precise reference time based oscillator of the stamping device. (As shown in FIG. 3, the time stamps have values $t_1$=0 ns, $t_2$=223.45 ns, $t_3$=558.75 ns, and $t_4$=804.80 ns.) The set of time stamps $t_i$ to $t_N$ are then collected and recorded, as are a series of data stamps $e_i$. In clock parameter extraction, no use is made of the data stamps $e_i$, which, in this case, are regular with an increment of P per stamp. (As shown in FIG. 3, the data stamps have values of $e_1$=1, $e_2$=3, $e_3$=5, $e_4$=7, etc.) Instead, the gathered time stamps $t_i$ are used to determine an array of actual clock cycle stamps $z_i$, each actual clock cycle stamp representing an integral number of actual clock cycles occurring between adjacent time stamps.

The actual clock cycle stamps may be calculated and compiled in an array by any suitable hardware or software-driven computer. To calculate the array of actual clock cycle stamps, the actual clock cycle stamp change $\Delta z_i$ (phase change in unit intervals or u.i.) is first computed on the basis of the time stamps $t_i$, $t_{i+1}$, and a nominal clock frequency $f_{nom}$ provided through input 36, e.g., a keyboard. The actual clock cycle stamp change $\Delta z_i$ is derived by inserting the nearest integral number of nominal clock-cycles between time stamps according to the following formula:

$$\Delta z_i = INT[f_{nom} \cdot (t_{i+1} - t_i) + 0.5]$$

The actual clock cycle stamp change $\Delta z_i$ is equal to the phase change in unit intervals (of the counter) between one time stamp $t_i$ and an adjacent stamp $t_{i+1}$. The integer (INT) function truncates any non-integer value (e.g., 4.2 becomes 4; 4.8 becomes 4). By adding 0.5 to the equation, the INT function rounds the operand value to the nearest integer, thereby converting the truncating into a round-off function. (As shown in FIG. 3, the $z_i$ values are all integers.)

This process of calculating the actual clock cycle stamp changes is performed for all of the $\Delta z_i$ values from i=1 to N, synthesizing an overall $z_i$ array from the $t_i$ array of time stamps. The $z_i$ values can be determined by sequentially adding the particular $\Delta z_i$ values to an arbitrary reference value $z_o$; in this example, $z_o$ is equal to 1. (As shown in FIG. 3, the actual clock cycle stamps have values of $z_1$=1, $z_2$=11, $z_3$=26, and $z_4$=37). The two arrays of parameters $t_i$ and $z_i$ sufficiently characterize the underlying clock by providing clock cycle data $t_i$ extracted directly from the data signal and comparing this data to whole number (integer) actual clock cycle stamp $Z_i$ reference values.

The system according to the present invention is highly repeatable and operable over a wide and well-defined range. The system is highly repeatable because the outcome of the underlying clock cycle estimation process comprises only whole numbers, and barring gross errors analogous to false locking and loss of loop in phase lock loops, the outcome is the same independent of any particular implementation detail. Any non-uniqueness arises from limitations in timing resolution of the time stamps, but this is typically under 50 picoseconds.

To avoid clock parameter recovery failures analogous to lose-lock in a phase lock loop, and for the system to operate properly, the nominal frequency must be sufficiently close to the actual frequency ($f_{act}$) of the underlying clock sought to be recovered by the system. More particularly, a necessary condition for successful operation is that the following error formula be satisfied:

$$|\Delta f \cdot \Delta t| < \tfrac{1}{2}$$

where $\Delta f$ is the frequency error $|f_{nom} - f_{act}|$ between the nominal and actual frequencies, and $\Delta t$ is any time interval $(t_{i+1} - t_i)$ being fitted by an actual clock cycle stamp change $\Delta z_i$. When the error formula is violated, this means that $\Delta z_i$ may be rounded off to the wrong integer. As is evident from the formula, short time intervals can tolerate larger frequency errors. Conversely, large modulation on the clock, and/or an insufficient sampling rate, may lead to clock parameter recovery failure.

In order to meet the requirements of the error formula, one can choose a smaller measurement time (smaller pace setting) and larger sampling size (for a higher sampling rate). The pace setting of the time stamping device may also be adjusted to change $\Delta t$. Therefore, one should set the pace value of the time stamping device based on the characteristics of the underlying data clock to be recovered. A pace value of one is best for accurate results, but suffers from the constraint of available memory to store the array of measured time stamps and calculated actual clock cycle stamps. Therefore, such a low pace value should be used when the system involves a fluctuating or unstable underlying data clock, or when the nominal frequency input cannot be adequately characterized to meet the error formula.

If the data clock is relatively stable, and the nominal frequency can be accurately predicted to be sufficiently close to the actual frequency, a low pace value is not required. In this case, one should choose the pace value simply to meet the requirements of Nyquist's theorem, that is, the sampling rate of the time stamping device should be at least twice the actual jitter bandwidth of the underlying clock. This can be significantly less than the clock frequency, thousands and even millions of times less.

Once the array of actual clock cycle stamps $z_i$ is calculated, the combination of $z_i$ and $t_i$ can be used in a computer or other hardware means to provide a variety of information concerning the data signal. Instantaneous frequency $F_i$, for example, is obtained by dividing the phase change $\Delta z_i$ by the time difference $\Delta t_i$ between adjacent stamps according to the following formula:

$$F_i = \frac{\Delta z_i}{\Delta t_i}$$

In essence, the instantaneous frequency $F_i$ is a corrected frequency derived from a predictor frequency $F_{nom}$. Rewriting $F_i$ as $F_{corrected}$ and $F_{nom}$ as $F_{predictor}$, the following equations are derived:

$$\Delta t_i = t_{i+1} - t_i,$$

$$F_{corrected} = \frac{INT[F_{predictor} \cdot \Delta t_i + 0.5]}{\Delta t_i}$$

$$\Delta Z_i = \Delta t_i \cdot F_{corrected}$$

The number of actual clock cycles is obtained by rounding off to the nearest integer the number of nominal clock cycles occurring within $\Delta t_i$. It should be noted that $\Delta z_i$, the actual clock cycle stamp changes, are integers, each change representing the nearest whole number of actual clock cycles occurring within a time interval $\Delta t_i$. It should also be noted that other frequencies besides an arbitrary nominal frequency value $f_{nom}$ can be used as a predictor frequency, for example, an adjacent instantaneous frequency $F_{i-1}$ may effectively be used.

Figure 4:
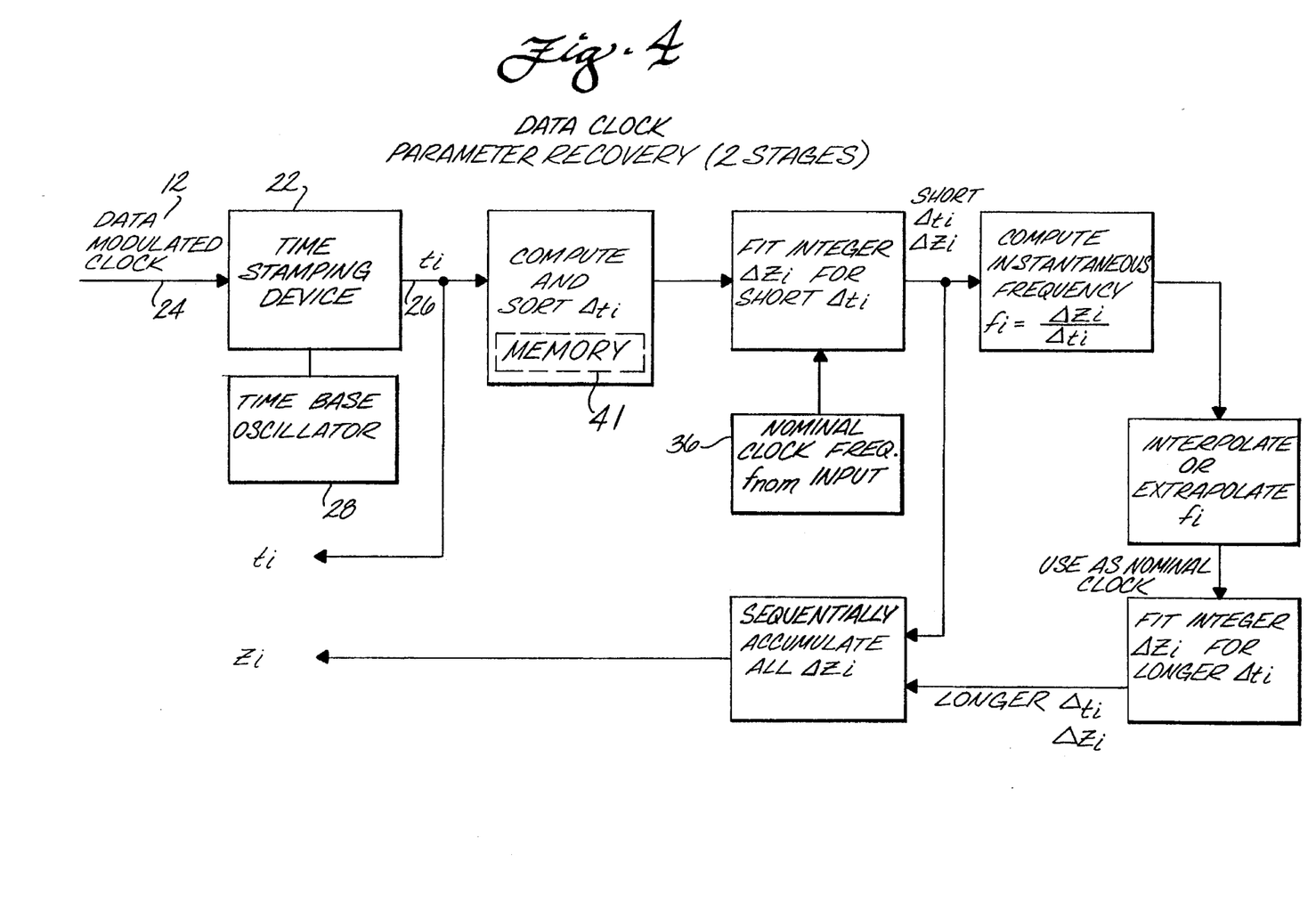
FIG. 4 is a block diagram of an alternate dual stage embodiment of the clock parameter recovery section of FIG. 2.

A dual stage data clock parameter recovery section as illustrated in FIG. 4 embodies a system for predicting frequencies for longer time intervals which may be prone to cause violation of the error formula and instability of the system. First, the data modulated signal is time stamped by the time stamping device 22. The time stamp intervals $\Delta t$ between adjacent time stamps are then computed and sorted according to length of the interval. The relatively shorter intervals $\Delta t_{i(short)}$ are suitable for actual clock cycle stamp changes $\Delta z_i$ based on a nominal clock frequency obtained from input 36. A set of instantaneous frequencies $F_i$ is then determined based on the shorter values of $\Delta t_i$ and corresponding values of $\Delta z_i$. These, or interpolated or extrapolated versions of these, are then, in turn, used as nominal clock predictor frequencies to predict relatively moderate and, finally, relatively longer time intervals $\Delta t_{i(long)}$.

The actual clock cycle stamp changes $\Delta z_i$ are then sequentially accumulated to obtain a complete array of $z_i$ values for the entire data signal. This bootstrap method, therefore, allows successful clock recovery under larger modulation than can be obtained using a user-input nominal clock frequency $f_{nom}$ alone as a predictor.

Figure 5:
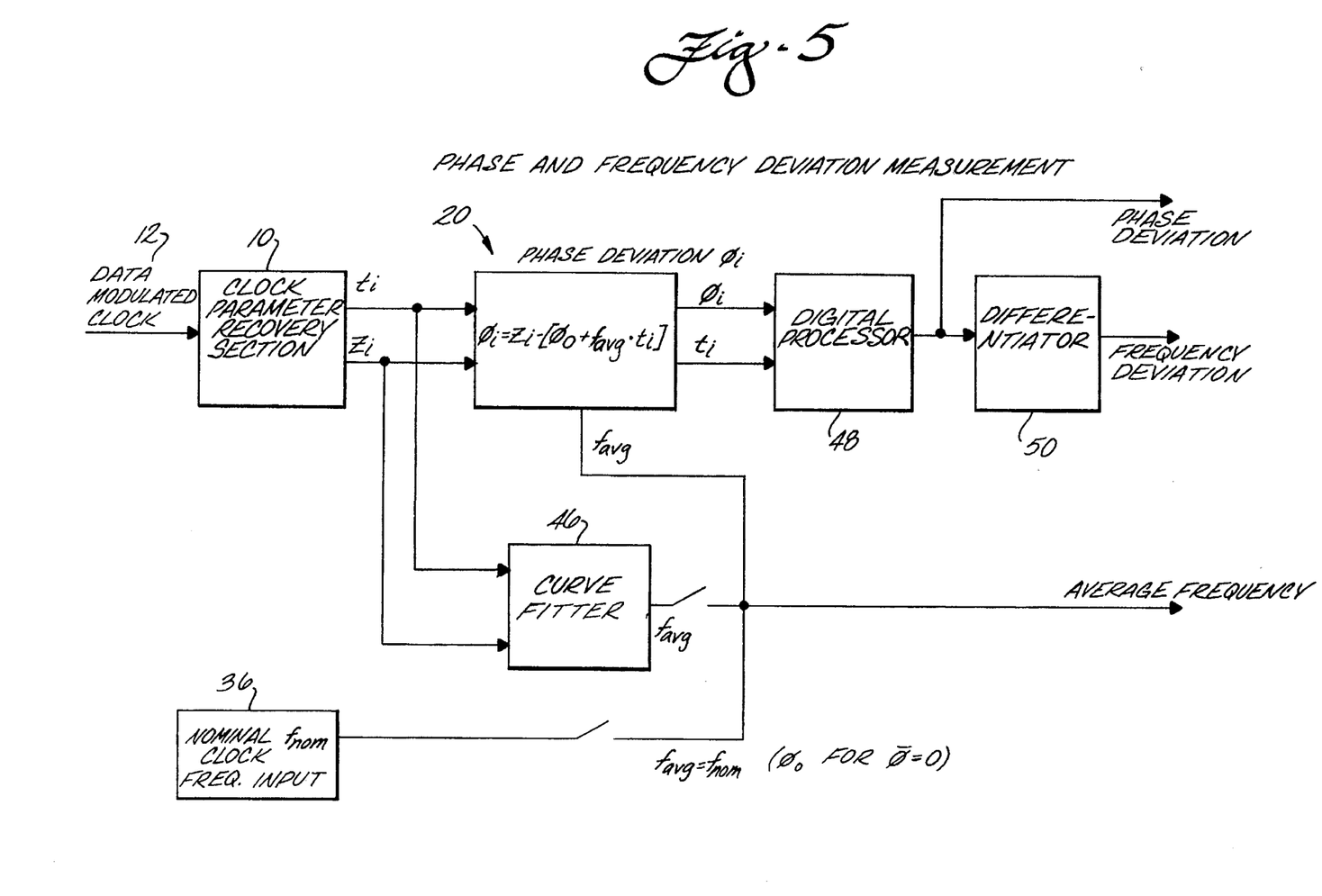
FIG. 5 is a block diagram of an embodiment of the processing section of the system of FIG. 1.

Referring to FIG. 5, the phase and frequency deviation measurement section (one exemplary embodiment of the processing section 20 of the system), receives the arrays of time stamp ($t_i$) and actual clock cycle stamp ($z_i$) data and uses the arrays to calculate phase and frequency information of the data modulated signals 12. By using the effectively recovered clock parameters, this information concerning the underlying clock can be obtained with a very modest rate of sampling compared to the high data bandwidth, and no literal physical clock need be recovered.

Average frequency ($f_{avg}$) of the data clock is determined by first synthesizing an overall array of actual clock cycle stamps $z_i$ by sequentially summing all of the $\Delta z_i$ values as follows:

$$Z_{i+1} = \sum_{k=1}^{i} \Delta Z_k$$

The initial value of $z_i$ is arbitrary and of no significance. Once the array of actual clock cycle stamps is determined, a curve fitter 46 is used to determine average frequency through linear regression, for example. Other curve fitting schemes may be used. The curve fitter simply fits the best straight line in the min-square sense to the $z_i$ and $t_i$ data over the data range of N points. The slope of the line yields the least square average frequency.

Phase deviation, or jitter, $\phi$ is determined on the basis of the average frequency ($f_{avg}$) according to the formula:

$$\phi_i = z_i - [\phi_o + f_{avg} \cdot t_i]$$

where $\phi_i$ = phase deviation, $z_i$ = the actual clock cycle stamp, $\phi_o$ = the initial phase deviation, and $t_i$ is the corresponding time stamp reading. The calculated phase deviation $\phi_i$ is then passed through a digital filter 48 in order to produce a more precise reading. Frequency deviation is determined by merely differentiating the phase deviation measurements over time using a differentiator 50.

A wide variety of other measurements may also be made in the digital processor 48 as a function of the recovered underlying clock parameters using digital filtering techniques. For example, a high pass filter may be used to separate jitter and wander measurements. (Jitter is phase deviation above 10 Hz bandwidth; wander is phase deviation below 10 Hz bandwidth.) Other measurements may also be made including, for example, phase-spectral density, Allan variance, TVAR, and TDEV. Fourier transforms may be used to obtain other useful data. Some or all of the recovered data can be displayed or used to control the overall system through controls 21 (FIG. 1).

Although described thus far in terms of characterizing parameters of an underlying clock for determining phase and frequency of the data signal, the present invention may also be used during the course of decoding the received data signals using the measured array of time stamps $t_i$ and the calculated array of actual clock cycle stamps $z_i$. To decode, however, every edge of the data signal must be sampled to satisfy the Nyquist rate by adjusting the pace value of the time stamping device. Once every edge is sampled, and characterized as rising or falling, the data signal can be reconstructed, and the data read by a decoder, implemented in digital processor 48. In addition to decoding, when every edge of the data modulated signal is sampled, clock-to-clock jitter and cycle-to-cycle jitter measurements can be made.

It should be noted that the clock recovery system can operate from time stamps stored in memory or in real time. Using the clock parameter recovery system in situations where the time stamps are stored in memory, the system can be used to scan the signal and determine an accurate predictor frequency based on a small Δt. Then, the data can be read backward or forward, as the case may be, to sample the rest of the data. This is a significant advantage because such computations yield more accurate results (less failure) than simply a forward-looking method. The system of FIG. 4 is suitable for calculations based on time stamps stored in memory 41. This is the preferred embodiment.

In real time clock parameter extraction, only a limited number of consecutive time stamps are available at any given time in a dynamic fashion. FIG. 2 illustrates an embodiment whereby only two adjacent time stamps $t_i$ (current) and $t_{i-1}$ (previous) from time stamping device 22 are available for subtraction to generate $\Delta t_i = t_{i+1} - t_i$ and for fitting actual clock count difference $\Delta z_i$ (34) via the use of blocks 30 and 36. After summing $\Delta z_i$ to generate $z_i$ (46) by accumulator 40, both $t_i$ (48) and $z_i$ (46) are outputted for digital signal processing. In the next sample, the index i is incremented by one. The current time stamp then becomes the previous time stamp and the newly acquired time stamp then becomes the current time stamp. Then the process repeats. The system still can be useful to calculate underlying clock parameters and phase-frequency information within a relatively modest sampling rate compared to the high data bandwidth. The system of FIG. 2 is suitable for calculations based on real time data signal input.

Figure 6:
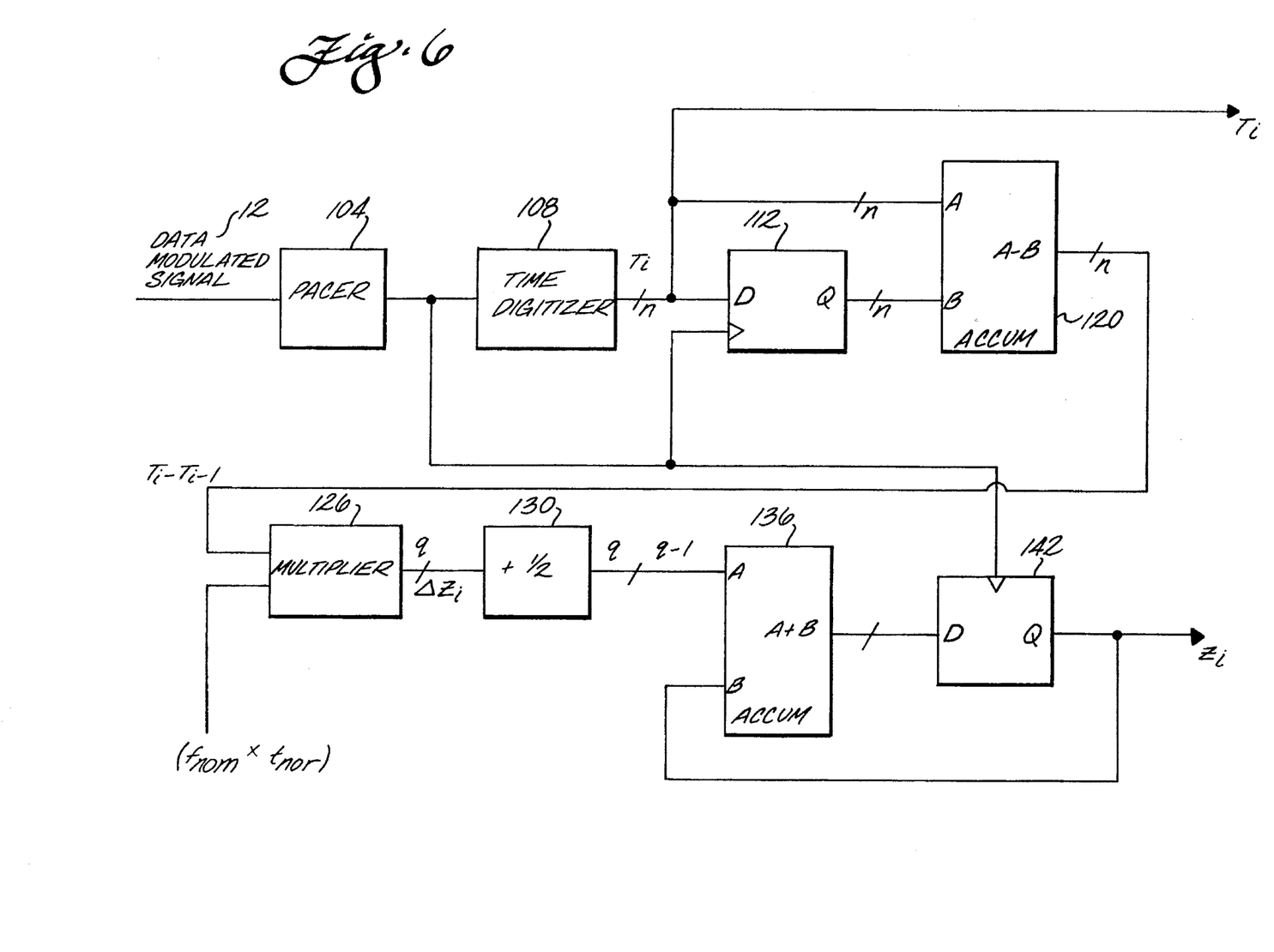
FIG. 6 is a hardware representation of a real time measurement system based on FIG. 2.

Referring to FIG. 6, in a hardware embodiment of the present invention, a data modulated signal, such as an NRZ signal, is paced by a pacer, e.g., a programmable hardware frequency divider 104 by a pace factor P. The paced signal is used to trigger a time digitizer 108 which produces an n-bit digital output $T_i$, which is a digital representation of the physical time $t_i$. The least significant bit of $T_i$ represents the time-resolution of the time digitizer $t_{nor}$, typically well below 1 ns. The mathematical relationship between $t_i$ and $T_i$ is simply $t_i = T_i \cdot t_{nor}$. Register 112 is a buffer memory which records the result of the previous measurement $T_{i-1}$. Both current result $T_i$ and previous result $T_{i-1}$ are fed into accumulator 120 which subtracts the two consecutive results to form an n-bit difference $\Delta T_i = T_i - T_{i-1}$. The size of n is chosen to accommodate the largest time difference allowed.

The n-bit difference is fed into a multiplier 126 which multiplies the difference $\Delta T_i$ by a number equal to the product of the nominal frequency $F_{nom}$ and $t_{nor}$, and generates a q-bit result. The effect of this multiplication is the same as multiplying the physical time $\Delta t_i$ by the frequency $F_{nom}$, since $\Delta T_i \cdot (F_{nom} \cdot t_{nor}) = (\Delta T_i \cdot t_{nor}) \cdot F_{nom} = \Delta t_i \cdot F_{nom}$. The least significant bit of this result should be ½, and further refinement has no benefit. The round-off process is represented by adding ½ to the q-bit result by adder 130 and then truncating the least significant bit to give a q−1 bit result of $\Delta z_i = z_i - z_{i-1}$. This $\Delta z_i$ difference is accumulated by an accumulator 136 to give the sequence $z_i$. A buffer 142 sequences the z results for the proper timing for accumulation. Just prior to being triggered, the buffer feeds the result $z_{i-1}$ to accumulator 136, but shortly after trigger, the result $z_i$ will appear at the output of the buffer. Both $T_i$ and $z_i$ are outputs of the clock parameter recovery process. The time stamps $T_i$, strictly speaking, should be multiplied by $t_{nor}$ before being outputted as physical time stamps $t_i$. But in practice, $T_i$ is used in further processing for various applications rather than $t_i$. Normalization is done when all processes are completed.

While the invention has been described and illustrated with reference to specific embodiments, those skilled in the art will recognize that modifications and variations may be made without departing from the principles of the invention.

What is claimed is:

1. A method for recovering parameters of an underlying clock from data signals comprising the steps of:

selectively sampling the data signals to produce a plurality of time stamps;

inputting a nominal clock cycle frequency; and determining a nearest integral number of actual underlying clock cycles between adjacent time stamps as a function of the nominal clock cycle frequency and time stamps.

2. The method of claim 1 further comprising the step of characterizing parameters of the underlying clock by determining an array of the time stamps and an array of actual clock cycle stamps, each actual clock cycle stamp representing an integral number of actual clock cycles occurring between adjacent time stamps.

3. The method of claim 2 further comprising the step of determining the average frequency of the underlying clock by fitting a curve through the array of characterized parameters.

4. The method of claim 2 further comprising the step of controlling system performance as a function of recovered clock parameters.

5. The method of claim 2 further comprising the steps of:

determining instantaneous frequency of the underlying clock as a function of the characterized clock parameters; and inputting the instantaneous frequency as the nominal clock cycle frequency for determining additional elements of the array of actual clock cycle stamps.

6. The method of claim 5 further comprising the step of computing instantaneous frequencies determined from short time intervals and extrapolating the computed instantaneous frequencies before the inputting step for determining actual clock cycle stamps of long time intervals.

7. A system for recovering parameters of an underlying clock from data signals comprising:

time stamping means for selectively sampling and locating edges of the incoming data signals and producing a series of time stamps;

frequency input means for recording a nominal clock signal frequency; and computing means for determining an array of actual clock cycle stamp changes as a function of the time stamps and the nominal clock signal frequency according to the formula:

$$\Delta z_i = INT[F_{nom} \cdot (t_{i+1} - t_i) + 0.5].$$

where $\Delta z_i$ is an actual clock cycle stamp change indicative of an integral number of actual clock cycles occurring between time stamps, $F_{nom}$ is the nominal clock signal frequency, $t_i$ is a time stamp, and $t_{i+1}$ is a subsequent time stamp.

8. The system of claim 7 further comprising means for determining an array of actual clock cycle stamps by sequentially adding actual clock cycle stamp changes to a reference actual clock cycle stamp value.

9. A system for characterizing parameters of an underlying clock from data modulated signals comprising:

a time digitizer for producing digital representations of times of occurrence of selected edges of the data modulated signals;

a first accumulator coupled to the time digitizer for calculating a time interval between adjacent selected edges;

a multiplier for determining a number of nominal clock cycles occurring within the time interval; and a second accumulator coupled to the multiplier for accumulating data from the multiplier and time digitizer and characterizing the underlying clock by determining an integral number of actual clock cycles occurring within the time intervals between adjacent selected edges.

10. The system of claim 9 further comprising a frequency divider coupled to the time digitizer for pacing the data modulated signals before the signals are input into the time digitizer.

11. The system of claim 9 further comprising a register coupled to the time digitizer and first accumulator for recording adjacent times of occurrence of selected edges for input into the accumulator.

12. The system of claim 9 further comprising a nominal frequency input coupled to the multiplier for determining the number of nominal clock cycles occurring between the time interval.

13. The system of claim 9 further comprising an adder coupled to the multiplier for rounding the number of nominal clock cycles occurring between the time intervals to an integer.

14. A system for recovering data clock parameters from data modulated signals comprising:

means for producing time stamps of selected portions of incoming data modulated signals;

means for accumulating the time stamps and determining time intervals between selected time stamps;

means for determining a number of digital counts occurring within selected time intervals; and means for accumulating digital count data and time stamps for characterizing the data clock.

15. The system of claim 14 wherein the time stamp means comprises pace setting means for controlling the sampling rate of the incoming data modulated signals.

16. The system of claim 14 wherein the means for determining the number of digital counts comprises a multiplier and a nominal frequency input.

17. The system of claim 14 wherein the means for determining the number of digital counts comprises means for determining the nearest whole number of underlying clock cycles occurring within each time interval.

18. The system of claim 14 further comprising means for buffering incoming data modulated signals coupled to the time stamp means.

19. The system of claim 14 further comprising means for decoding the underlying clock data as a function of the accumulated digital count data and time stamps.

20. The system of claim 14 further comprising means for characterizing phase-frequency information of the underlying clock as a function of the accumulated digital count data and time stamps.

* * * * *